United States Patent Office 3,224,746
Patented Dec. 21, 1965

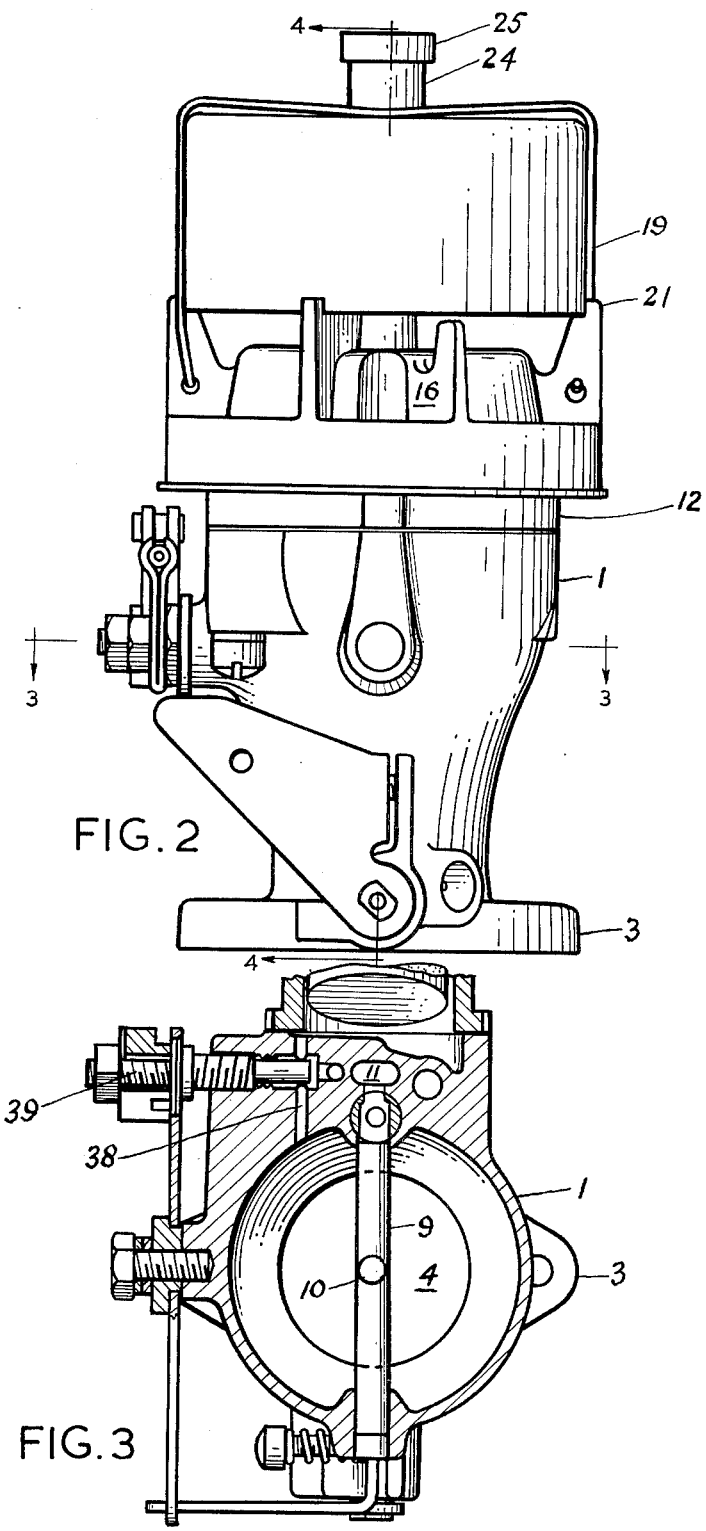

3,224,746
AUTOMATICALLY VARIABLE CHOKE
CARBURETOR
Edward Harley Boyle and Albert Frederick Geissler,
Cronulla, near Sydney, New South Wales, Australia,
assignors to Efficax Industries Pty. Limited, Sydney,
New South Wales, Australia, a company of New South
Wales
Filed Dec. 12, 1962, Ser. No. 244,084
Claims priority, application Australia, Dec. 14, 1961,
12,409/61
2 Claims. (Cl. 261—50)

This invention relates to an automatically variable choke carburetor wherein a combustible mixture of fuel in atomized form and air is admitted to a mixing chamber and regulated entirely by the suction of the engine with which the carburetor is incorporated.

Broadly the carburetor of this invention comprises a body defining a spherical-"drop" like chamber. There is provided a main air inlet at the top of the chamber and a throttle valve in an outlet at the bottom. A cylinder is mounted on the chamber above the main air inlet. A piston in the cylinder has a piston rod which passes through the main air inlet and a member of substantially conoid shape is mounted on the end of the piston rod in the chamber. A spring is arranged to move the piston so that the conoid member will close the main air inlet. A fuel delivery tube to the chamber is connected to a source of fuel supply. An air inlet duct is connected to the fuel delivery tube and a valve to regulate the flow of fuel to the fuel delivery tube has a stem by which it is connected to the piston.

Figure 1:
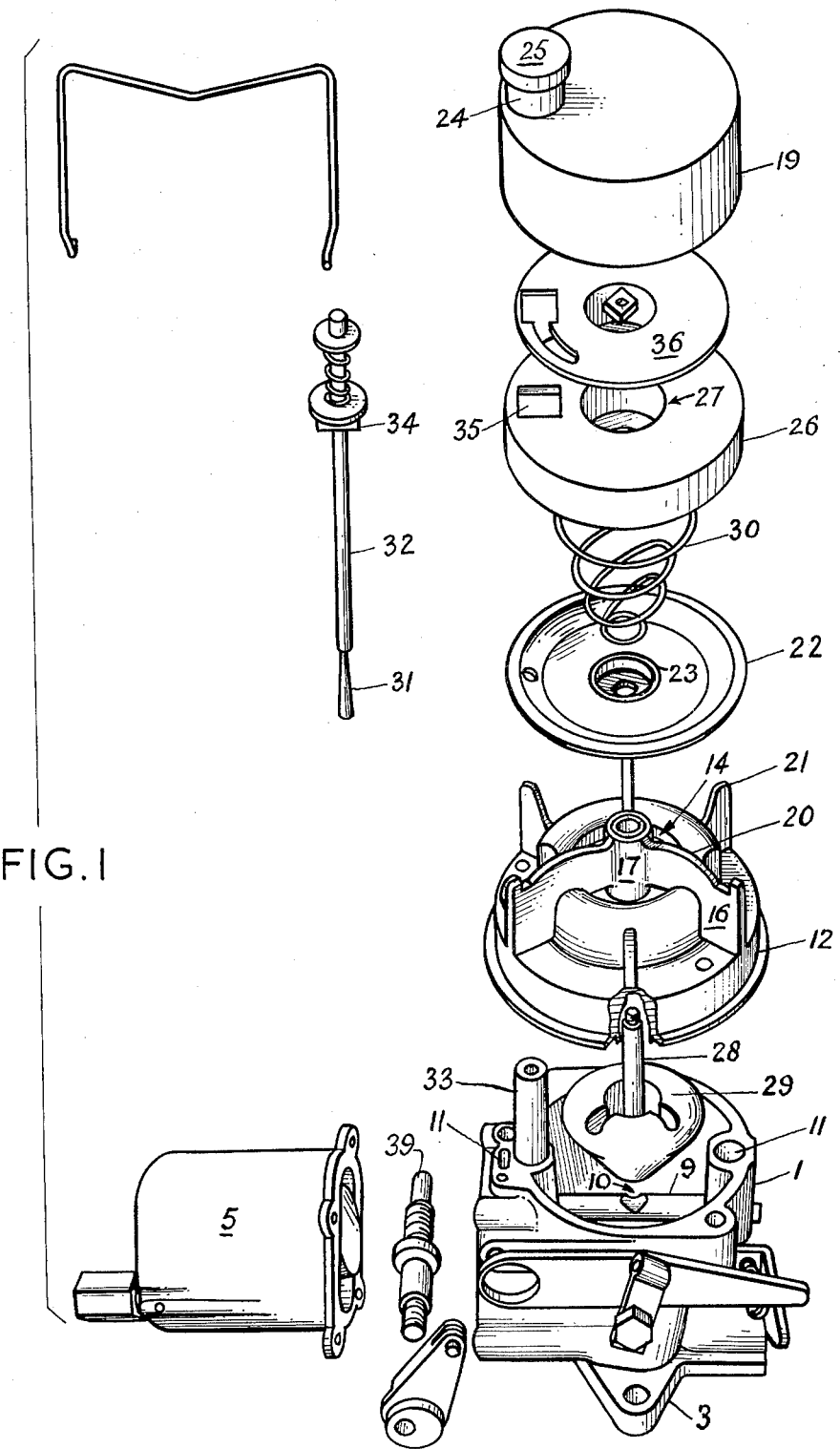
Figure 4:
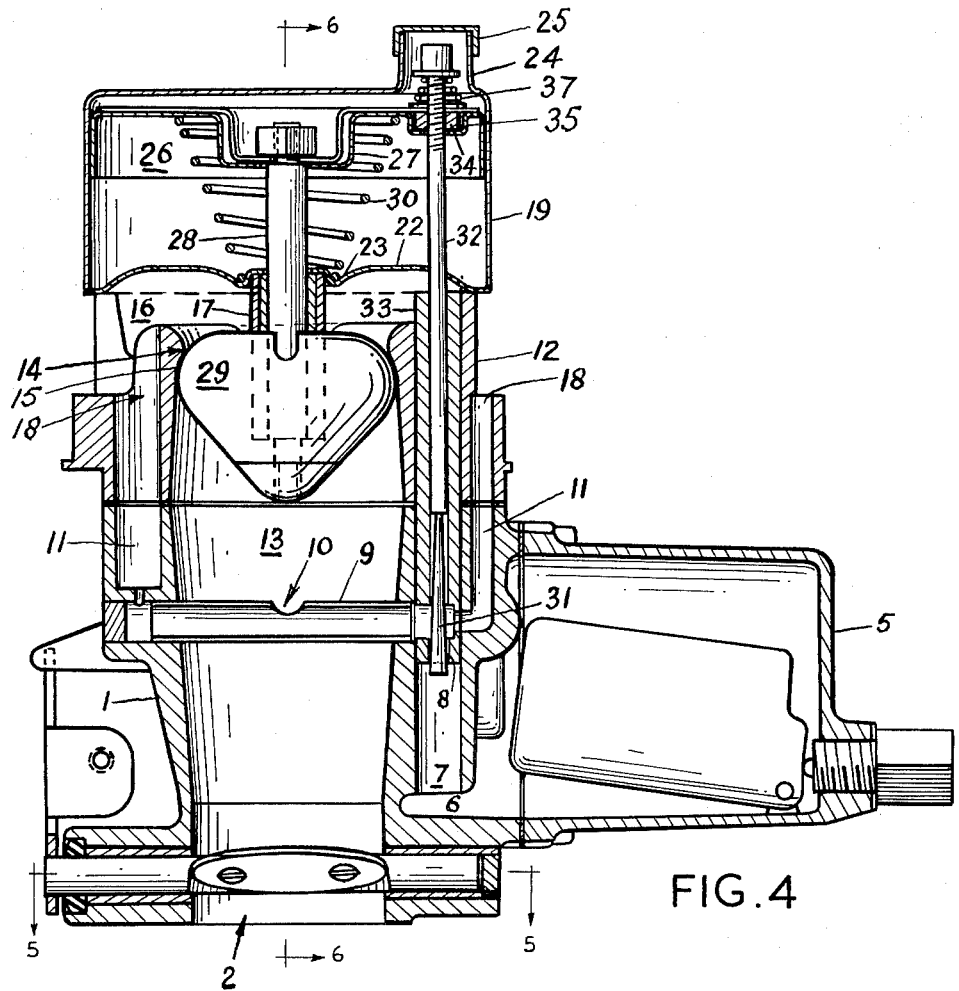
Figure 5:
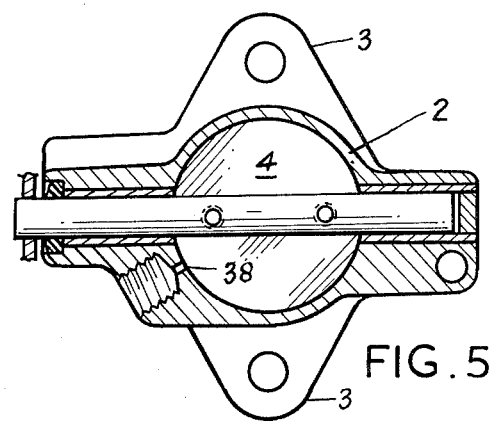
Figure 6:
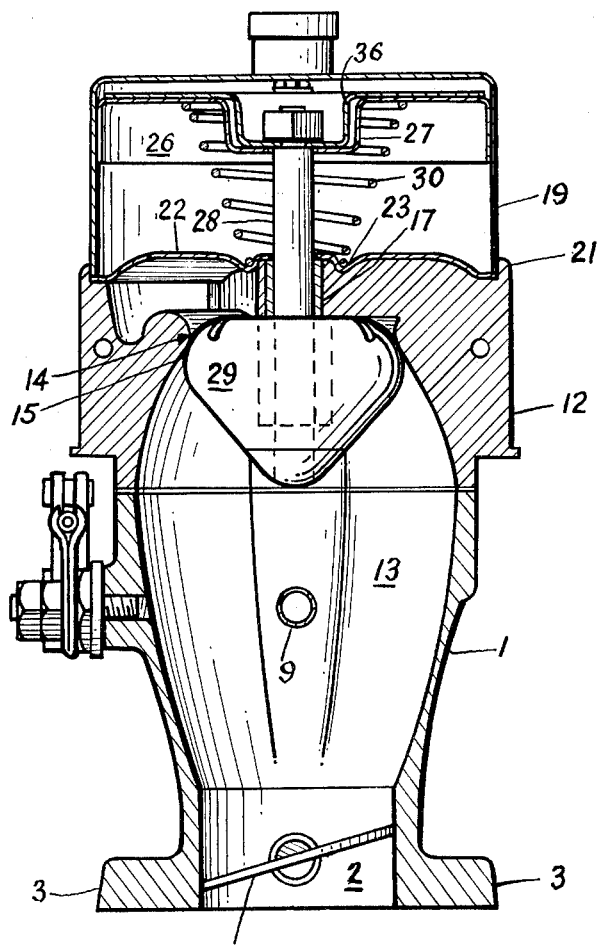

A preferred embodiment of the invention is described with reference to the annexed drawings wherein:

FIGURE 1 is an exploded perspective view of the carburetor,
FIGURE 2 is a side elevation view of the assembled carburetor of FIG. 1,
FIGURE 3 is a section on line 3—3 of FIGURE 2,
FIGURE 4 is a side elevation on line 4—4 of FIGURE 2,
FIGURE 5 is a sectional plan on line 5—5 of FIGURE 4,
FIGURE 6 is a side elevation on line 6—6 of FIGURE 4.

In this embodiment the chamber of "drop-like" shape is made in two parts. The lower part 1 extends into a cylindrical throat 2 and there is a flange 3 on the bottom of the throat whereby the carburetor is mounted on an engine intake manifold. A conventional throttle valve 4 is mounted in the throat 2 and it is actuated in a conventional manner. A float chamber 5 with conventional fittings is mounted on the side of the lower part 1.

A fuel inlet port 6 from the float chamber 5 connects to a metering valve chamber 7 in the wall of the lower part 1. The metering valve chamber has an outlet 8 to a fuel delivery tube 9 which is mounted transversely across the lower part 1. Tube 9 has an outlet 10 in the top part of its wall located medially in the lower part 1. Each end of the tube 9 is connected to atomizing air ducts 11 which extend through the wall to the top of the lower part 1.

The upper part 12 of the chamber is mounted on the top of the lower part 1 and its internal wall is in registry with the internal wall of the lower part 1 and forms therewith an open ended chamber 13 having an upper opening 14 which is an air inlet. The edge of the chamber 13 at the air inlet 14 is formed as a seat 15. A spider frame 16 formed on the upper part 12 has a hollow boss 17 which projects axially into the chamber 13. The air inlet 14 is the main air inlet to the chamber 13 and the inlet to air ducts 11 is through ports 18 in the top of the part 12.

The spider frame 16 extends upwardly on the part 12 to provide a support for cylinder 19. The elements of the frame 16 each have an arcuate top 20 and a cylinder locating lug 21. An annular plate 22 which constitutes a base for the cylinder 19 sits on the spider frame and the hollow boss 17. It is contoured to conform to the spider frame and this contour provides a substantially unrestricted air passage to the chamber main air inlet 14. A spring locating groove 23 is formed in the plate 22.

The cylinder 19, considered independently of plate 22, is open at the bottom and closed at the top and there is a tubular projection 24 adjacent the top edge with a cap 25 thereon. The cylinder seats on and is closed by the annular plate 22.

A light weight piston 26 in the cylinder 19 has a central depressed boss 27 wherein a piston rod 28 is secured. The piston rod passes through and is guided by the hollow boss 17. A conoid 29 has an axial cavity into which a part of the hollow boss 17 projects and constitutes a slide guide for the conoid. The conoid 29 is fixed to the piston rod 28 below the boss. The conoid 29 is of such size that when it is in its upper position it will seal against the seat 15 but when it is moved into the chamber 13 there will be provided an air passage around the conoid which increases to a maximum size when the conoid is in its lowermost position. The conoid 29 is held in its upper position by a spiral spring 30, the small end of which is accommodated in the locating groove 23 while the large end surrounds and is located by the boss 27 on the piston 26. The spring holds the conoid in the closed position. The conoid is moved from this position by engine suction.

A reverse taper metering valve 31 adapted to regulate the flow of fuel through the outlet 8 into the tube 9 has its stem 32 slidable in and projecting through a guide tube 33 in the chamber parts 1 and 12. Its upper end is adjustably fixed to the piston 26 by a nut 34 which is retained in a socket 35 by a disc like member 36 fixed to piston 26. The valve stem 32 projects through the member 36 into the tubular projection 24 and a weak spring 37 is incorporated to hold the valve in a selected position. By this adjusting provision the valve can be set to admit fuel for engine idling as well as for power output. The valve is actuated in conformity with the movement of the conoid.

When an engine incorporating this carburetor is running, air flowing through the atomizing ducts 11 draws fuel through the outlet 10 into the chamber 13 and atomizes the fuel which flows upwardly in the chamber to mix with air flowing downwardly around the conoid 29 into the engine. The piston 26 in the cylinder 19 constitutes a pneumatic damper and prevents rapid oscillation or "fluttering" under engine pulsative influences. It also prevents excessively rapid movement of the conoid 29 when the throttle valve 4 is opened suddenly thus momentarily increasing the choking effect of the conoid.

A rich cold-start fuel supply is provided through an independent jet 38. It is controlled by a valve 39 which is actuated manually or automatically in a conventional manner.

We claim:
1. An automatically variable choke carburetor comprising a body defining a chamber of tear-drop shape with a lower cylindrical throat extension, a main air inlet at the top of said chamber and a throttle valve in the cylindrical throat extension of the chamber, a float chamber connected to the lower part of said body, said body having a valve chamber, a fuel inlet port connecting said float chamber to said valve chamber, a fuel delivery tube mounted transversely across said chamber and having an outlet located medially in said chamber, said outlet being in the top of said tube facing said air inlet, an atomizing air duct connected to each end of said fuel delivery tube and extending through said body to inlet ports in the top thereof, a cylinder mounted on said body above said main air inlet, a piston in said cylinder including a piston rod which passes through said main air inlet, a conoid mounted on the bottom end of said piston rod, a spring in said cylinder acting on said piston to move said conoid to a position in which said main air inlet is closed, a reverse taper valve in said valve chamber to regulate the flow of fuel to said fuel delivery tube, said valve including a stem connected to said piston, the cylinder being open at the bottom and closed at the top, the body including a spider frame above said chamber, an annular plate mounted on said spider frame, said spring being between the piston in the cylinder and the annular plate to urge the piston upwardly, said conoid being displaced downwardly upon opening of the throttle valve which subjects the conoid to suction, and a valve seat in said valve chamber and against which the valve is seated with said piston in an uppermost position in which the main air inlet is closed by the conoid, said valve which regulates the flow of fuel being moved away from its valve seat by downward movement by said piston.

2. An automatically variable choke carburetor according to claim 1 wherein said spider frame includes a hollow boss and constitutes a base for said cylinder and provides an air passage under said cylinder to said chamber, said piston rod passing through and being guided by said hollow boss, said conoid having an axial cavity into which part of said hollow boss projects and constitutes a guide for slidable movement of said conoid.

References Cited by the Examiner

UNITED STATES PATENTS

| | | | |
|---|---|---|---|
| 1,258,787 | 3/1918 | Kidder | 261—50 |
| 2,128,079 | 8/1938 | Dawes | 261—50 |
| 2,194,540 | 3/1940 | Breeze | 261—50 |
| 2,210,055 | 8/1940 | Atkins | 261—50 |
| 2,574,670 | 11/1951 | Sweeney | 261—50 |

FOREIGN PATENTS

| | | |
|---|---|---|
| 435,768 | 9/1935 | Great Britain. |
| 515,040 | 11/1939 | Great Britain. |

HARRY B. THORNTON, *Primary Examiner.*

HERBERT L. MARTIN, *Examiner.*